United States Patent

[11] 3,626,281

| [72] | Inventor | Michel Henry Pierre Souillard<br>Fontenay-aux-Roses, France |
|---|---|---|
| [21] | Appl. No. | 839,011 |
| [22] | Filed | July 3, 1969 |
| [45] | Patented | Dec. 7, 1971 |
| [73] | Assignee | Compagnie Des Compteurs<br>Paris, France |
| [32] | Priority | July 5, 1968 |
| [33] | | France |
| [31] | | 158001 |

[54] METHOD FOR THE SELECTIVE DETECTION OF THE DEFECTIVE CONDUCTOR OR CONDUCTORS IN A THREE-PHASE SYSTEM
5 Claims, 4 Drawing Figs.

[52] U.S. Cl. .................................................. 324/51,
317/18, 317/27
[51] Int. Cl. ........................................................ G01r 31/02
[50] Field of Search .......................................... 324/51, 52;
317/18, 27

[56] References Cited
UNITED STATES PATENTS

| 3,048,745 | 8/1962 | Warrington ................. | 317/27 |
| 3,488,559 | 1/1970 | Souillard ..................... | 317/18 |

FOREIGN PATENTS

| 1,501,814 | 11/1967 | France ....................... | 324/52 |

*Primary Examiner*—Gerard R. Strecker
*Attorney*—Pierce, Scheffler & Parker

ABSTRACT: A method for selecting a conductor or conductors of a three-phase power transport line and device for operating the same which when an earth fault has been determined detects for which phase the negative sequence or inverse component makes with the zero sequence or homopolar component an angle less than 60° then for which of the detected phase the negative sequence or inverse and the positive sequence or direct components make an angle exceeding 90°, and which when a defect not earthed has been determined detects for which of the phases the angle between the inverse and direct components make an angle less than 60°.

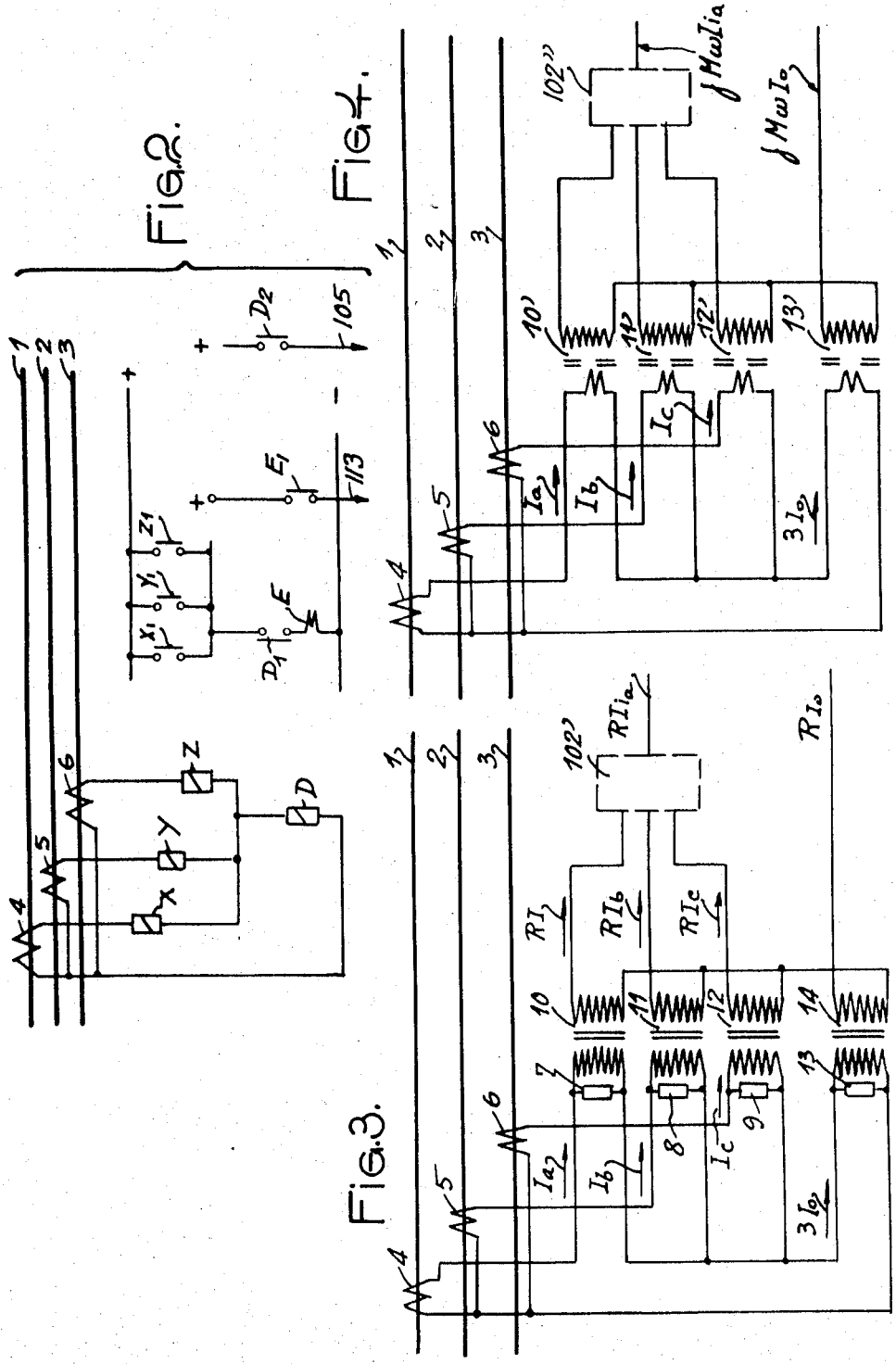

METHOD FOR THE SELECTIVE DETECTION OF THE DEFECTIVE CONDUIT OR OR CONDUCTORS IN A THREE-PHASE SYSTEM

The present invention relates to a method for selective detection of the defective conductor or conductors in a three-phase system and more particularly to a method of ascertaining a defective conductor or conductor from the phase displacements of symmetrical components of the voltages or currents of a three-phase power transport line in which occurs an asymmetrical defect.

The invention has particularly the object of drawing up phase selection orders from a comparison of the phase displacements between direct, inverse and homopolar symmetrical components of voltages and/or intensities of currents appearing when there is a fault at the point where the device is connected.

For understanding the following explanation, we note by $Va$, $Vb$, $Vc$ the voltages between phases A, B, C and the neutral at the terminals of a circuit putting the method into operation.

For carrying out an ascertainment of a defective conductor or conductors we have:

a. the three-phase balanced system of voltages in direct succession (or positive sequence), $Vd_a$, $Vd_b$, $Vd_c$:

$Vd_a = \frac{1}{3}(Va + aVb + a^2Vc)$
$Vd_b = \frac{1}{3}(Vb + aVc + a^2Va) = a^2Vd_a$
$Vd_c = \frac{1}{3}(Vc + aVa + a^2Vb) = aVd_a$ in which $a$ represents the rotation operator of a three-phase system:

b. the balanced three-phase system of voltages in inverse succession (or negative sequence), $Vi_a$, $Vi_b$, $Vi_c$:

$Vi_a = \frac{1}{3}(Va + a^2Vb + aVc)$
$Vi_b \frac{1}{3}(Vb + a^2Vc + aVa) = aVi_a$
$Vi_c = \frac{1}{3}(Vc = a^2Va + aVb) = a^2Vi_a$ c. The homopolar components of voltages, (or zero sequence) $Vo$:

$V_o = \frac{1}{3}(Va + Vb + Vc)$.

It will be advisable to call "privileged phase" A, B or C of a direct or inverse component, the phase whose voltages intervene without any rotation operator in the above-mentioned definition formulas; the direct and inverse components bear the reference of this privileged phase (for instance, $Vd_a$ is the direct component whose privileged phase is phase (A).

One can, in a case of a fault, set up the following table between the phase displacements of the symmetrical components of voltages:

TABLE OF THE PHASE DISPLACEMENTS BETWEEN THE SYMMETRICAL COMPONENTS OF VOLTAGES ACCORDING TO THE CASE OF CURRENT FAULTS

| Case of fault | AN | BCN | BC | BN | ACN | AC | CN | ABN | AB |
|---|---|---|---|---|---|---|---|---|---|
| Angle: | | | | | | | | | |
| $Vi_a/Vo$ | 0 | 0 | | −120° | −120° | | +120° | +120° | |
| $Vi_b/Vo$ | +120° | +120° | | 0 | 0 | | −120° | −120° | |
| $Vi_c/Vo$ | −120° | −120° | | −120° | −120° | | 0 | 0 | |
| $V_o/Vd_a$ | 180° | | | | | | | | |
| $Vi_a/Vd_a$ | 180° | 0 | 0 | | | +120° | | | −120° |
| $V_o/Vd_b$ | | | 180° | 0 | | | | | |
| $Vi_b/Vd_b$ | | −120° | 180° | 0 | | | | | +120° |
| $V_o/Vd_c$ | | | | | | 180° | 0 | | |
| $Vi_c/Vd_c$ | | +120° | | −120° | | 180° | 0 | | 0 |

In the table, the blank spaces mean that no value can be shown either because homopolar components do not exist, as in the case of a fault between phases, or because this data is not required for the actual existing fault.

The invention relates particularly to a method for checking a defective conductor or conductors for faults with an earth connection. The method is characterized in that one separates the six cases of asymmetrical faults, in a first stage, by detecting the one of the three inverse components of the simple voltage systems whose angular displacement with the homopolar component of the same voltages is less than 60° for a phase; the privileged phase of the inverse voltage thus retained being then that of the conductor which has a privileged role, i.e., is either alone in fault (monophase fault between this conductor and earth), or along not defective (fault between the two other conductors and the earth); at a second stage, the method according to the invention detects the angular displacement of the inverse and direct components of voltages having for privileged phase that found in the first stage and one connects the terms "monophase fault between this privileged phase and the earth" to an angular displacement exceeding 90° and the terms "biphase fault between two phases other than the privileged phase and the earth" to an angular displacement of less than 90°. This result arises out of the table given above.

Actually, taking into account certain simplifying hypotheses as previously mentioned, the computations of defective currents show that, in the case of an earth fault, the inverse component is either in phase, or in phase opposition with the direct component of voltages while taking as privileged phase the axis of the fault. Under these conditions, the theoretical angular displacement between the two components could only assume two values: 0 or 180°. The fact that simplifying hypotheses are not always checked explains that the actual angular displacements can be different from these values. It is for this reason that we admit an area of angular uncertainty of ±90° to separate the monophase earth fault from the biphase earth fault.

Moreover, the method according to the invention effects the separation of the three cases of asymmetrical fault without earth connection by detecting which is the one of the three inverse components of the system of simple voltages whose angular displacement with the direct component of the voltages of the same privileged phase is less than 60°, this privileged phase then being that of the only one conductor which is not defective (biphase fault between the two phases other than the found privileged phase).

The separation between faults with earth connection and faults without earth connection is then carried out by means of a device of a type known in itself for detecting the appearance of homopolar or zero sequence components. For instance, one The values as stated in the table result from conventional computations of a current fault, but these computations are made out with a certain number of simplifying hypotheses, i.e., it is presumed that only one side of the line starting from the measuring point is defective and that there are no defective resistances, i.e., that one considers only the obvious faults.

The fact that these hypotheses are not always confirmed in actual practice leads to a dispersion in relation to the values given in the table and it is thus necessary to consider a certain angular area around said values.

may use the device described in French Pat. No. 1,501,814 and in U.S. Pat. No. 3,488,559 both assigned to Compagnie des Compteurs.

According to one method of operating the invention, instead of inverse and homopolar components of voltages, one uses inverse and homopolar components of line currents.

According to another method of operating the invention, one uses inverse and homopolar components of voltage drops produced by the currents of the line in image impedances having the same argument as impedances of the power network.

Other characteristics of the invention will arise out of the description which follows as well as the accompanying drawings given by way of nonrestrictive embodiments of the invention.

FIG. 2 is a diagram showing part of the elements appearing in FIG. 1.

FIG. 3 shows an alternative embodiment of a characteristic part of FIG. 1.

FIG. 4 shows another alternative of part of FIG. 1.

Figure 1:
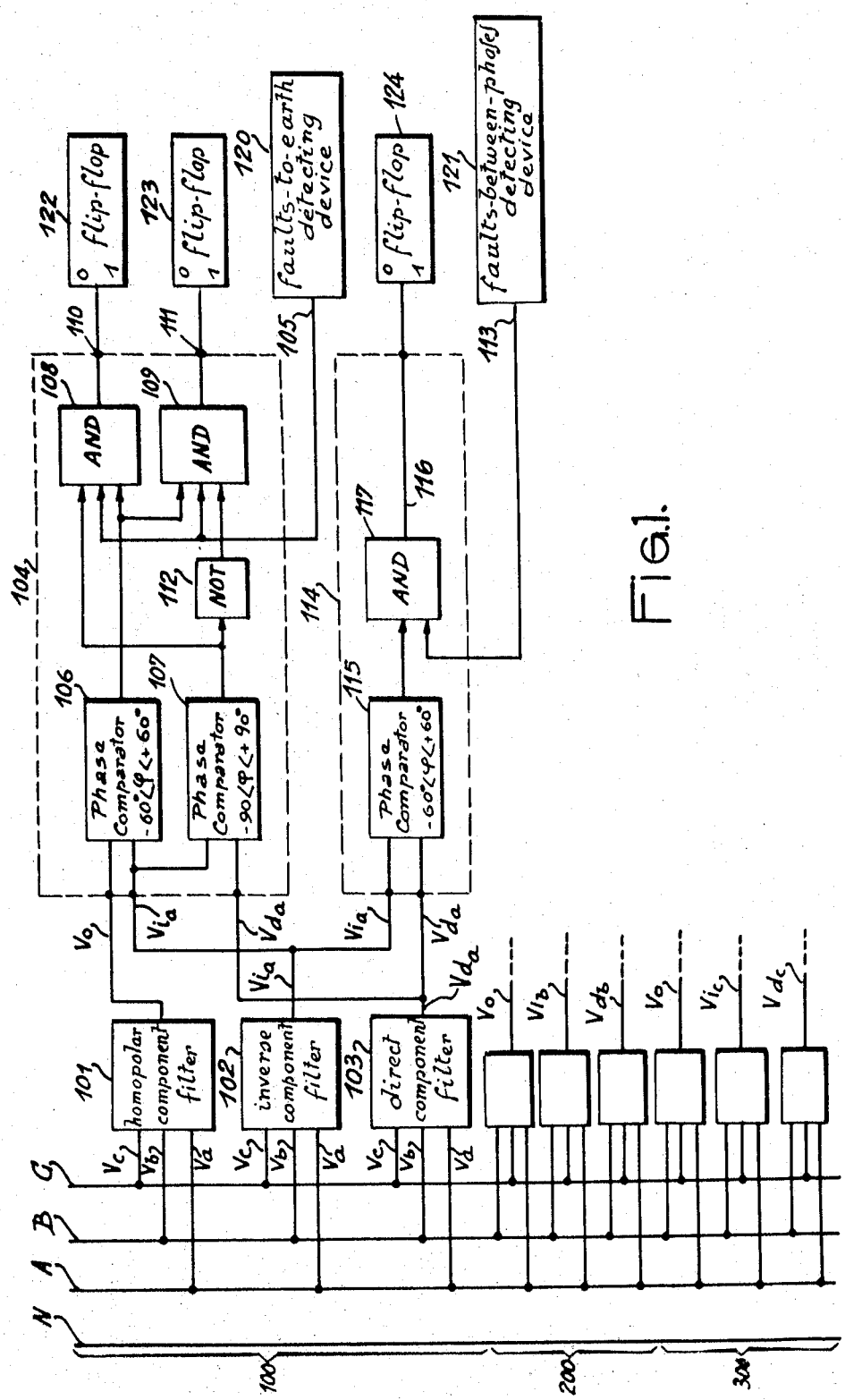
FIG. 1 is a diagram showing an embodiment of the device according to the invention.

FIG. 1 shows diagrammatically the device assembly according to the invention and comprises three assemblies 100, 200 and 300. Assembly 100 is applied to the selection of faults between phase A and the earth as well as, between phases B and C and the earth, and between phases B and C without earth connection. The assemblies 200 and 300 are obtained by circular permutation of the input magnitude for obtaining either faults between phase B and earth, between phases C and A and earth, and between phases C and A without earth connection, or faults between phase C and earth, between phases A and B and earth and between phases A and B without earth connection.

To simplify the diagram and explanations, only one of these assemblies, namely assembly 100, has been shown in detail in FIG. 1, but it is obvious that the selection of the nine cases of possible faults necessitates the three above-mentioned assemblies.

In FIG. 1, A, B and C are line phase conductors, and N the earth conductor of the three-phase system to which the invention applies. Symmetrical component filters 101, 102, 103 are fed by line voltages by means of conventional voltage transformers (not shown).

At the output thereof, filter 101 delivers the homopolar or zero sequence component $Vo$ of the three-phase input system. The filter 102 delivers the inverse component $Vi_a$ related to the privileged phase A. The filter 103 delivers the direct component $Vd_a$ related to the same privileged phase A. A large number of devices give the symmetrical components of a three-phase system, and on this subject, one may refer to Mr. Atabekov's book "The relay protection of high voltage networks"—PERGAMON Press—Chapter IV" "Symmetrical component filters" pages 121-172.

The assembly shown in dash line by reference numeral 104 enables the ascertaining of the existence of monophase and biphase earth faults of the privileged conductor A. Its functioning is authorized provided that the conductor 104 is already taken to the logical level 1. Said conductor 105 is connected to a device 120 for detecting faults to earth such as that described in said French Pat. No. 1,501,814. This device is thus not shown in detail in FIG. 1. Any other device may be used for giving a signal (logical level 1) when the line to be supervised is the seat of an earth fault, for instance, the device which is described in relation to FIG. 3 may be used as well.

Now it refers to making a comparison of the phases of the various signals $Vo$, $Vi_a$ and $Vd_a$ between them.

For this, a series of phase comparators is used, which each give a signal when the displacement between two input magnitudes in comprised within a certain angular area.

Numerous known devices such as phase discriminators allow this function to be fulfilled, such as, for instance, those based on the conversion of an angular displacement between two magnitudes in a time shift difference, and on the technique of time-voltage conversion in ramp generators. One must also mention the possible use of a device issuing an output order when in the vectoral representation of periodical electric magnitudes, the vector representing one of the magnitudes is situated in the angle formed by two other vectors corresponding to two-phase reference magnitudes. A device of this kind is described in French Pat. No. 1,477,510 of Jan. 25, 1966, assigned to the same company as the previously mentioned French Pat. No. 1,501,814, and concerning a "Logical method and circuits for detecting the angular displacement sign of periodic signals in relation to one of them taken as reference signal."

A phase comparator 106 is fed, on the one hand, by the homopolar voltage $Vo$, and on the other hand, the inverse component $Vi_a$ of the voltages relating to phase A. It issues a level 1 logical order when the angle between the homopolar voltage and the inverse voltage relating to phase A is less than 60°; this only happens for a fault having the privileged phase A, i.e., it refers to an earth monophase fault AN or earth biphase BCN (N being the earth conductor). Actually, as can be seen in the above table, an angular displacement between the inverse components relating to phase A and the homopolar component can assume three theoretical values: 0 (AN fault), −120° (BN fault), +120° (CN fault). Consequently, the possible uncertain margin is thus ±60° and an angular displacement value between $Vi_a$ and $Vo$ or an angular area equal to 0 ±60° is significative of the only faults of privileged phase A.

A comparator of phases 107 effects the separation between the faults AN and BCN. It compares the phase of the inverse voltage $Vi_a$ relating to phase A with that of the direct voltage $Vd_a$ relating to this same phase. It issues a logical level 1 output order when the angular displacement between these two voltages is greater than 90°, which only occurs, for a fault of privileged phase A, in the case of a monophase fault between phase A and the earth (AN fault).

A logical gate 108 of the AND-type issues an output order when its three inputs are at level 1. To this end, it is necessary, on the one hand, that some kind of earth fault has been detected (conductor 105 at level 1), that the fault has phase A as privileged phase (output of comparator 106 at state 1) and lastly, that it refers to a monophase fault (output of comparator 107 at state 1). The output 110 of said gate 108 is thus only at state 1 in the case of a monophase fault between phase A and earth N.

In the same way, a logical gate 109 and the AND-type issues a logical level 1 order provided that an earth fault has been detected (conductor 105 at level 1) and that this fault has phase A as privileged phase (output of comparator 106 at state 1), and at last that there clearly exists a biphase earth fault (output of an inverter 112 at state 1 corresponding to the comparator output 107 at state 0). The output 111 of said gate 109 is thus at stage 1 only in the case of a fault between phases B and C with earth connection.

In FIG. 1, an assembly shown in dash line by reference numeral 114 enables the selection of biphase faults (phases B and C) without earth connection. Its functioning is only authorized if a conductor 113 is taken to the logical level 1. A device 121 is provided for only providing such signal when the line is the object of a fault between phases without earth connection. An order of this kind can be given, for instance, during the coinciding of the output order of a device for starting up at maximum intensity and detecting all types of faults, and the absence of an output order of the device only sensitive to earth faults used for controlling the gates 108 and 109.

FIG. 2 shows an example of embodiment of the device 121. In this figure, the conductors 1, 2 and 3 are the conductors of phases A, B and C of the line. By means of intensity transformers 4, 5 and 6, one feeds, on the one hand, three maximum intensity relays X, Y and Z, and on the other hand, between the common point of 4, 5 and 6 and the common point of X, Y, Z, there is connected a maximum intensity relay D which is traversed by the residual current of the line proportional to the homopolar current. The arrangement of work contacts $X_1$, $Y_1$, $Z_1$ in parallel with the rest contact $D_1$ clearly shows that the relay E will only be energized if an overcurrent occurs in the line without the accompanying appearance of any residual current. The relay E will thus not close the contact $E_1$ enabling a polarity to be applied to the conductor 113, unless a fault occurs on the line between two phases without earth connection. Consequently, the working of any one of the relays of phase X Y Z combined to the no functioning of the relay of the residual current D is a criterion of a fault between phases without earth connection.

In this embodiment, it is possible to provide a second contact $D_2$ for the relay D which will be thus only energized during the passage of a homopolar current. An output of the relay D is then connected to the conductor 105 thus forming the device 120 of FIG. 2 and applying a positive polarity (logical order 1) to the conductor 105 in the case of an earth fault.

A phase comparator 115 (FIG. 1) detects the value of the angular displacement of the inverse voltage $Vi_a$ in relation to the direct voltage $Vd_a$ relating to the phase A. It issues a logical level 1 output order provided that this angular displacement is less than 60°. This case only occurs in the event of a fault without earth connection, for a biphase fault between phases B and C. The output 116 of the logical circuit 117 is thus at state 1 only in the case of a fault between the phases B and C without earth connection.

It then suffices to provide at the respective outputs 110, 111 and 116 of the gages AND 108, 109 and 117, a relay or a flip-flop respectively 122, 123 and 124 sensitive to a logical state 1 to known whether we are in the presence either of a monophase fault between the phase A and earth indicated by flip-flop 122, or a fault between phases B and C with earth connection indicated by flip-flop 123, or else between phases B and C without earth connection indicated by flip-flop 124.

FIG. 3 shows an example of utilizing homopolar and inverse components of line currents. In said figure, the conductors 1, 2, 3 are the conductors of phases A, B, C of the line. By means of intensity transformers 4, 5 and 6, three equal resistors 7, 8 and 9 are fed. The three voltages developed at the terminals of these resistors of resistance R are transmitted by means of three voltage transformers 10, 11 and 12 to an inverse component filter 102' which has the same constitution as the filter 102 of FIG. 1. The output magnitude of this filter is proportional to the inverse component of the currents relating to phase A.

Likewise, a resistor 13 of resistance ⅓R is connected between the common point of the three resistors 7, 8 and 9 and the common point of the three intensity transformers 4, 5 and 6. Said resistor 13 is traversed by a current equal to $3Io$, $Io$ being the homopolar component of the currents defined by $$Io = \tfrac{1}{3}(IA + Ib + Ic).$$

The voltage developed at the terminals 13 is transmitted by the voltage transformer 14 which corresponds to the output filter 101 of FIG. 1. The respective outputs of the elements 102' and 14 are connected to the output of phase comparators similar to those described with relation to said FIG. 1.

In FIG. 4, we have shown an example of utilizing homopolar and inverse components of voltage drops developed by homopolar and inverse currents in image impedances which have the same arguments as the impedances of the network situated upstream from the means put into operation in relation to the position of the fault.

In FIG. 4, the conductors 1, 2 3 are the conductors of phases A, B, C of the line. By means of intensity transformers 4, 5 and 6, three mutual airgap impedances 10', 11', 12' are fed, which impedances deliver to the terminals of their secondary winding voltages proportional to the currents which traverse the primary windings, and shifted by 90° at the rear of these currents.

Thus, for instance, M being mutual inductance between the secondary and primary windings of 10', when a current $Ia$ traverses the primary winding of 10', the voltage delivered to the secondary is equal to $jM\omega Ia$, $\omega$ being the pulsation of the primary current. The three voltages at the terminals of the secondary windings of 10', 11' and 12' are transmitted to an inverse component filter 102", which is made like the filter 102 of FIG. 1. The output magnitude of this filter is proportional to the inverse component of currents relating to phase A and out of phase of 90° to the rear in relation to said phase $a$.

Likewise, an airgap mutual impedance 13 of mutual inductance coefficient ⅓M has its primary winding traversed by the triple of the homopolar component of the currents. It delivers to the secondary winding a voltage $jM\omega Io$ proportional to the homopolar component of the currents and out of phase of 90° at the rear of said homopolar component and which corresponds to the output of the filter 101 of FIG. 1. The respective outputs of the elements 102" and 13' are connected to the input of phase comparators similar to those described with relation to FIG. 1.

The invention is not restricted to the examples of embodiment shown and described in detail, for various modifications can be applied to them without going outside its scope.

I claim:

1. A method for selecting defective conductors on a three-phase power transport line comprising the steps of:
   detecting the simple electrical component magnitudes (voltage, current, voltage drops) of each of the three-phase conductors;
   determining by computation the direct (or positive sequence), and inverse (or negative sequence) and homopolar (or zero sequence), symmetrical components of the simple electrical magnitudes thus detected:
   measuring the angular shift between the inverse and homopolar components of said simple electrical magnitudes in order to check the inverse component or components whose angular shift with the homopolar component of the same magnitude is less than 60° whereby in case said angular shift is lower than 60° thus is determined at least a privileged phase corresponding to a conductor which is the only one at fault in the case of a monophase fault between said conductor and the earth and the only one not in fault in the case of fault between the two other conductors and the earth;
   measuring further, the angular shift between the direct and inverse component of said privileged phase to check it it is bigger than 90° whereby in case said angular shift is bigger than 90° thus is ascertained that the phase is in fault to earth and that said phase is on the contrary not in fault if said angular shift is lower than 90°; and
   measuring also the angular shift between the inverse and direct components of said simple electrical magnitudes to check to one of the three inverse components whose angular shift with the corresponding direct component is lower than 60° whereby in case said angular shift is lower than 60° thus is detected once more a privileged phase corresponding to the conductor which is not at fault in the case of a fault between phases.

2. A method as set forth in claim 1 characterized in that for determining a fault to earth it comprises the further steps of detecting supplementarily for each conductor phase the existence of a homopolar electrical magnitude and of ascertaining the simultaneousness of the existence of said homopolar magnitude with, on one hand, the characteristic angular shift between said homopolar component and said inverse component and, on the other hand, the characteristic angular shift between said direct and inverse components, whereby the risk of detecting a fictitious fault is avoided.

3. A method as set forth in claim 1 characterized in that, for determining a fault between phases, it comprises the further steps of supplementarily detecting for each phase the presence of an overcurrent without any homopolar current, and of ascertaining the simultaneousness of said overcurrent with the characteristic angular shift between the direct and inverse components of said phase, whereby the risk of detecting a fictitious defect is avoided.

4. A method as set forth in claim 1 characterized in that the simple electrical magnitudes thus detected are taken among voltages, currents or voltage drops of each line conductor.

5. A method as set forth in claim 1 characterized in that it comprises the further steps of applying the currents flowing in each conductor to impedances having the same argument as the impedance of the powerline to which said conductors belong in the part of said powerline situated upstream from the point where said currents are detected whereby image-voltages are determined from which are formed said direct, inverse and homopolar components.